Figure 1:
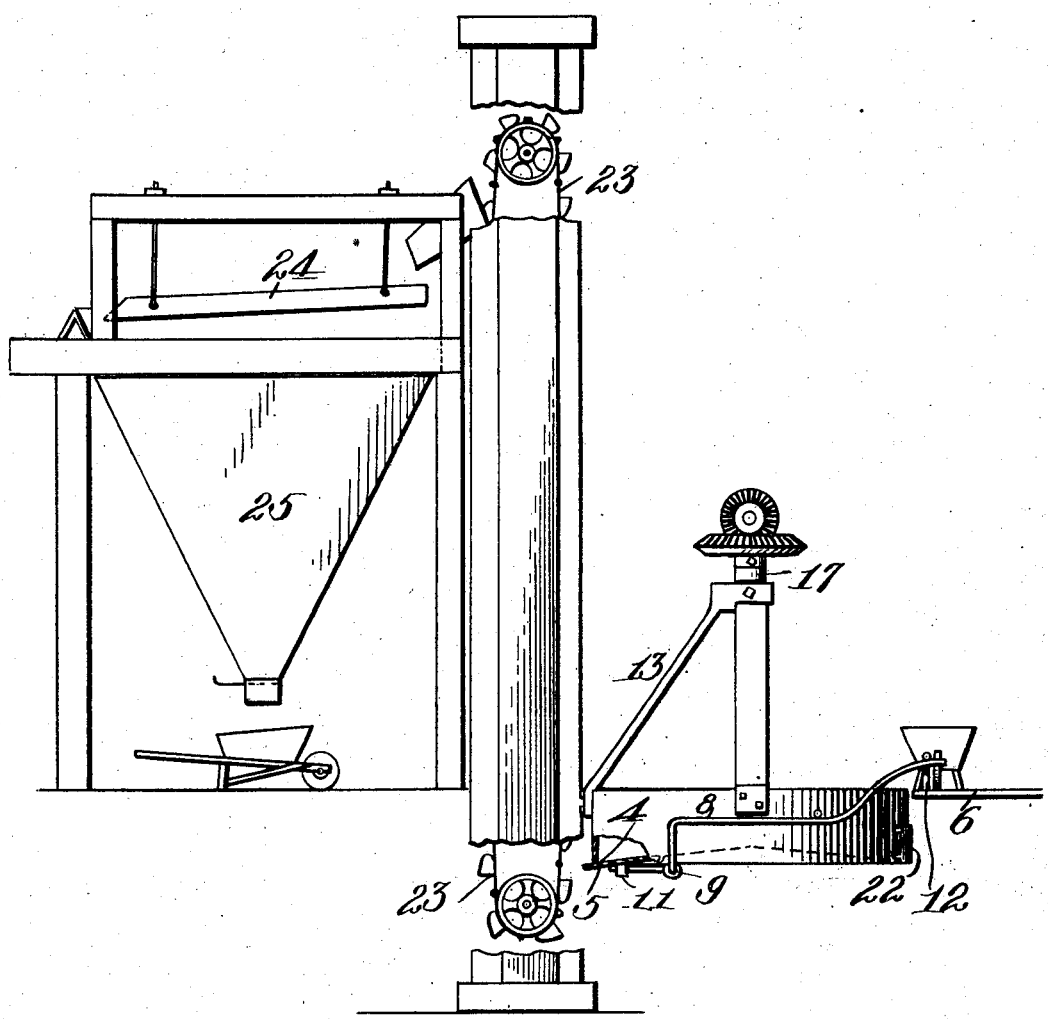

No. 751,393. PATENTED FEB. 2, 1904.
W. M. HALE.
FERTILIZER MIXING APPARATUS.
APPLICATION FILED JUNE 4, 1903.
NO MODEL. 2 SHEETS—SHEET 1.

Witnesses:
C. D. Kesler,
James L. Norris, Jr.

Inventor
William M. Hale
By James L. Norris
Atty.

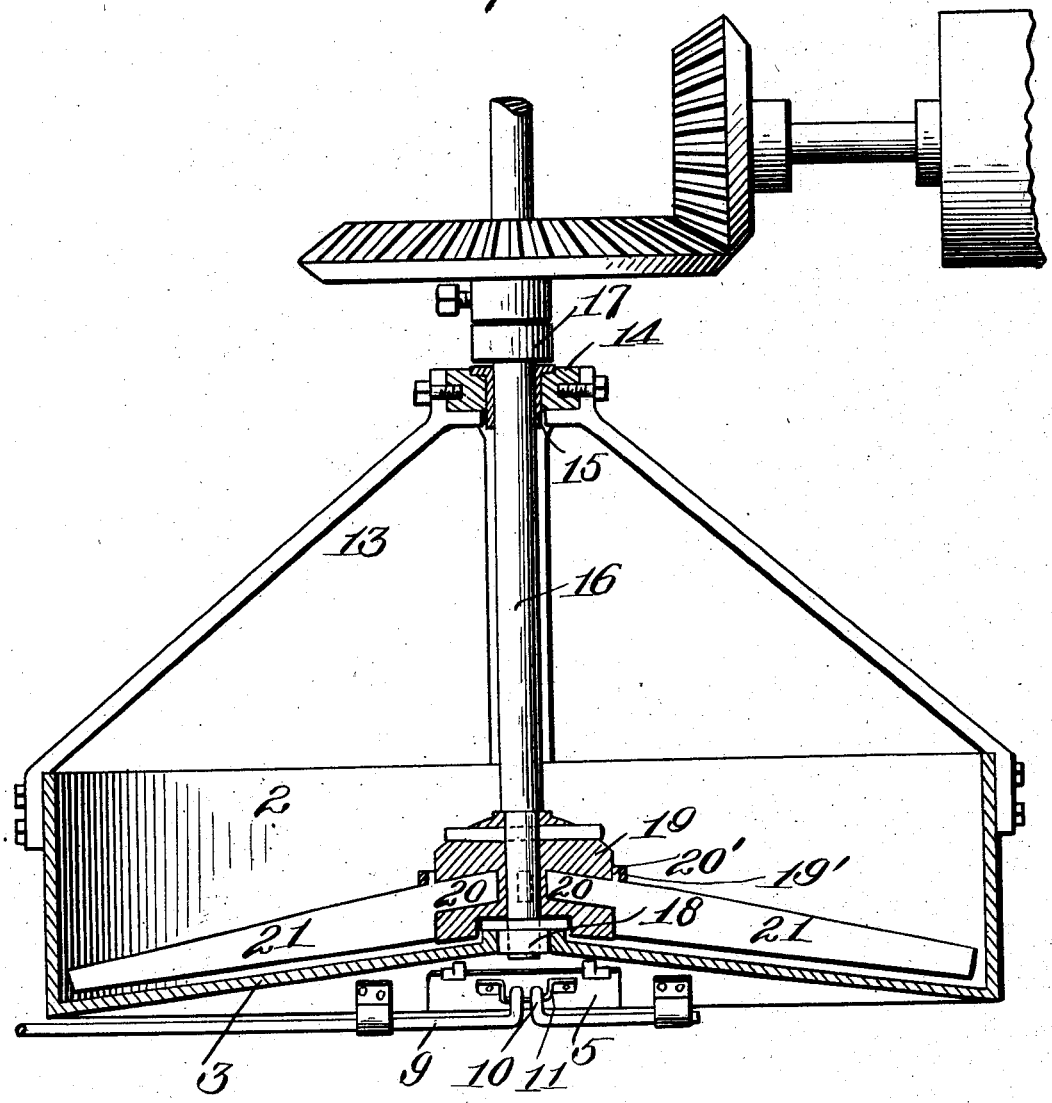

No. 751,393.

Patented February 2, 1904.

UNITED STATES PATENT OFFICE.

WILLIAM M. HALE, OF NASHVILLE, TENNESSEE.

FERTILIZER-MIXING APPARATUS.

SPECIFICATION forming part of Letters Patent No. 751,393, dated February 2, 1904.

Application filed June 4, 1903. Serial No. 160,121. (No model.)

*To all whom it may concern:*

Be it known that I, WILLIAM M. HALE, a citizen of the United States, residing at Nashville, in the county of Davidson and State of Tennessee, have invented new and useful Improvements in Fertilizer-Mixing Apparatus, of which the following is a specification.

This invention relates to a fertilizer-mixing apparatus; and the object of the invention is to provide a simple device of this character capable of rapidly and thoroughly mixing the different ingredients that are to constitute when mixed the finished product and in which said product will not be gummy, as is the case in certain existing apparatus with which I am familiar.

The improved apparatus possesses other objects and advantages, which will be set forth at length in the following description, while the novelty of the invention will be incorporated in the claims succeeding such description.

In the drawings accompanying and forming a part of this specification I have illustrated one effective adaptation of my apparatus, which I will describe fully in said description; but at this point I wish to state that I do not limit myself to the exact disclosure thus made, for certain variations as to several features of the invention may be adopted within the scope of my said claims.

I have adopted the title "fertilizer-mixing apparatus" as a convenient one. It is obvious, of course, that the apparatus may be used for mixing other ingredients.

Referring to the drawings, Figure 1 is an elevation of an apparatus involving my invention, showing the manner of supplying the ingredients thereto and for also disposing of the fertilizer after such ingredients have been mixed. Fig. 2 is a vertical central section of said mixing apparatus.

Like characters refer to like parts throughout both views.

Upon reference to the drawings it will be observed that the apparatus therein illustrated involves in its organization a pan, as 2, the body of which is cylindrical and is provided with a bottom 3, approximately of conical form. The ingredients to be mixed are discharged into this pan, where they are brought under the action of suitable mechanism in order to thoroughly blend the same, and by virtue of the peculiar form of the bottom the passage of the material toward a discharge-outlet 4, represented as formed in said bottom at or near its periphery, is facilitated. During mixing, the outlet or opening 4 is closed by a door 5, shown as being hinged and which is dropped down in order to permit the discharge of the pan. The pan 2 is set below a floor, as 6, or other foundation at such a distance that the upper edge of said pan will be substantially flush with the floor, whereby wheelbarrows or other devices containing the different fertilizer ingredients can have their contents readily emptied into the pan.

As previously stated, the door 5, which controls the discharge-outlet 4, is closed during the mixing operation, means of a suitable nature being provided to open said door at intervals in order to effect the delivery of the contents of the pan into a suitable elevator, or the finished product may be otherwise disposed of. A lever is shown at 8, said lever having an angular body. One branch of the body, or that one which is shown as being normally vertically disposed, is provided with an inwardly-disposed shaft portion 9, horizontally located and supported by suitable bearings upon the under side of the pan. The shaft portion 9 has between its ends a lateral arm 10, the free end of which is disposed in a loop or bracket 11 upon the under side of the dropdown door 5. The main or manually-operable branch of the lever 8 is adapted to fit normally under a hook or projection at the upper end of a standard or upright 12, rising from the floor 6, whereby the door 5 will be positively held closed. By slipping the manually-operable branch of the lever 8 from under the hook upon said standard 12 and elevating the same the door 5 may be opened or dropped down in order to uncover the outlet 4, whereby the contents of the pan 2 can be discharged therefrom, such contents passing onto the door (which when opened is at an inclination) and being directed by said door into the buckets along the inner run of an elevator, hereinafter more particularly referred to.

A spider is shown at 13, it having at its apex a central hub from which the arms of said spider extend angularly downward and outward, said arms being fastened at their lower ends in some suitable manner—say by screws—to the upper edge of the pan. Upon the inner side of the hub of the spider is an annular flange, which constitutes a suitable support for the collar 14, from which the sleeve 15 depends. The shaft 16 extends centrally through the collar and sleeve 15. The collar 14 is suitably fastened—say by screws—to the hub of the spider 13, whereby said collar and also the sleeve 15, which is usually made integral therewith, are held against rotation as the shaft 16 turns. The sleeve and shaft are shown as being vertically disposed. Upon the shaft and suitably fastened thereto above the collar 14 is a collar 17, which rests upon said first-mentioned collar. The shaft 16 is continuously rotated during the mixing operation and the discharge of the contents from the pan 2, and for this purpose any desirable means may be provided. In the present case this is accomplished through the agency of beveled gears, one of the beveled gears being suitably fastened to the vertically-disposed shaft 16, while the other one is likewise joined to a horizontally-disposed line-shaft supported by suitable bearings (not shown) and provided with a pulley or band wheel for operating the same. The lower end of the vertically-disposed shaft 16 is stepped into a bushing 18, fitted in a central opening in the concaved bottom 3. Said shaft 16 has fastened—say by a pin—to its lower end the hub or body portion 19, the bottom of which travels in contiguity to the upper face of the conical bottom 3, said hub being centrally concaved in its bottom to receive the bushing 18.

The hub 19 has a plurality of radial slots or seats, shown as four in number, and extending inward from the periphery thereof, which slots removably receive the offsets 20 at the inner upper corners of the mixing-arms 21. The blades or mixer-arms 21 have on their upper sides in proximity to the hub 19 lugs or shoulders 20', embraced by the hoop or band 19', so as to hold the offsets 20 in their seats. By lifting the hoop or band above said lugs any one or more of the blades can be readily removed and drawn through an opening in the pan, as will hereinafter appear. The lower edges of the mixing-arms, which arms of course extend radially from the hub 19, travel nearly in contact with the upper surface of the bottom 3, for this purpose they having a downward and outward inclination from said hub. These arms 21 upon the rotation of the shaft 16 serve to thoroughly mix the constituents which are to compose the finished product and also aid in feeding the mixture toward the circumference of the bottom. In order to secure a feeding effect from said arms, they are in the nature of blades and are given a twisted or slightly-spiral form. Said arms therefore propel or force the mass in the pan toward the outer edge of the bottom 3, the said movement being also aided by virtue of the novel shape of the bottom. The mixing-pan 2 is of course stationary, so that the use of complicated mechanism for supporting and rotating the same is thereby rendered unnecessary.

In operation wheelbarrows containing the different ingredients are rolled along the floor 6, and the contents thereof are discharged into the pan 2 through the upper side thereof, the door 5 at this time being closed. When a proper charge has been supplied to the pan, the shaft 16 is thrown into action, so that the arms 21 are caused to also turn and to practically traverse the bottom 3. As said arms operate they thoroughly mix the material in the pan and force such material toward the outlet or discharge opening 4. It requires in practice but a short time to mix the ingredients, and when they have been sufficiently mixed the door 5 is dropped down by the manipulation of the lever 8 in the manner hereinbefore described, so that on the continued rotation of the shaft 16 the arms 21 will feed the substance toward said outlet 4, the feed being also facilitated by the inclined bottom 3. It will require but a short time for the arms 21 to completely empty the pan.

The body of the pan has a manhole or opening situated at a point practically diametrically opposite to the door 5 and which is normally closed by a door 22, by opening which door 22 the mixer-arms can be readily reached in order to remove the same and replace others should this course be necessary at any time. The outer ends of these mixer-arms are in close proximity to the inner surface of the body of the pan 2, and they cannot, if constructed as hereinbefore described, be withdrawn by way of the open top of said pan. Said mixer-arms are preferably made of metal, so that they are not so liable to breakage as are wooden ones.

The driving mechanism for the mixer-arms is simple and can be readily reached at any time, as it is located above the pan 2.

The fertilizer is delivered by the drop-down door 5 when the same is open into the buckets of an elevator 23, which elevator delivers the material into a screen 24, mounted upon a suitable frame in proximity to the mixing apparatus, the screen sifting the material and discharging it cleaned into a hopper 25, suitably mounted below said screen. The delivery end of the hopper is controlled by a gate, by opening which the fertilizer can be delivered into a barrow or other desired receptacle.

Not only does the apparatus possess the advantages hereinbefore set forth, but it can be effectively operated with a considerable saving of labor, which is an important consideration in a factory using several of the apparatus.

Having thus described my invention, what I claim as new, and desire to secure by Letters Patent, is—

1. A pan having an approximately conical bottom and a discharge-outlet in proximity to the outer edge of said bottom, a drop-down door for normally closing said discharge-outlet, a door-closing device, and means for engaging said door-closing device to hold the door in a closed position.

2. In an apparatus of the class described, a pan having an approximately conical bottom and a discharge-outlet in proximity to the outer edge of said bottom, a drop-down door for normally closing said discharge-outlet, a hand-lever connected with the door for closing the same, and means for engaging the hand-lever to hold the door in a closed position.

3. In an apparatus of the class described, a pan having an approximately conical bottom and a discharge-outlet in said bottom in proximity to the outer edge thereof, and a drop-down door for normally closing said bottom, combined with means for mixing materials in said pan and for feeding the mixture toward said outlet.

4. In an apparatus of the class described, a pan having an approximately conical bottom and a discharge-outlet in said bottom in proximity to the outer edge thereof, combined with a shaft provided with detachably-mounted mixing-arms located in proximity to said bottom, the pan having an opening through which said arms may be removed.

5. In an apparatus of the class described, a pan, a shaft, having a hub, in the pan, and a plurality of mixing-arms in said pan provided at their inner ends with offsets removably fitted in slots in the hub, the pan having an opening through which said arms may be withdrawn.

6. In an apparatus of the class described, a pan, a shaft having a hub situated in said pan, a plurality of mixing-arms provided with offsets fitted in seats in said hub, and with lugs, and a band surrounding the lugs for holding the arms in assembled relation.

In testimony whereof I have hereunto set my hand in presence of two subscribing witnesses.

WILLIAM M. HALE.

Witnesses:
Wm. R. Martin,
G. N. Bagwell.